US012640141B1

(12) United States Patent
Hussain et al.

(10) Patent No.: US 12,640,141 B1
(45) Date of Patent: May 26, 2026

(54) **SEMI-SUPERVISED TRAINING OF AUTOMATIC SPEECH RECOGNITION SYSTEMS USING ITERATIVE *n*-best PSEUDO-LABELING**

(71) Applicant: Zoom Video Communications, Inc., San Jose, CA (US)

(72) Inventors: Juan Hussain, Wörth am Rhein (DE); Thai Son Nguyen, Karlsruhe (DE); Sebastian Stüker, Karlsruhe (DE); Zhirong Ye, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 219 days.

(21) Appl. No.: 18/649,203

(22) Filed: Apr. 29, 2024

(51) Int. Cl.
　　*G10L 21/00*　　　(2013.01)
　　*G10L 15/16*　　　(2006.01)
　　*G10L 25/00*　　　(2013.01)
(52) U.S. Cl.
　　CPC ................................... *G10L 15/16* (2013.01)
(58) Field of Classification Search
　　USPC .......................................................... 704/270
　　See application file for complete search history.

(56) References Cited

U.S. PATENT DOCUMENTS 12,198,689 B1 *　1/2025　Whitenack .............. G10L 15/16
2023/0335122 A1 *　10/2023　Biadsy .................... G06N 3/04
2024/0013777 A1 *　1/2024　Lu ........................... G10L 15/16
2024/0021190 A1 *　1/2024　Biadsy .................... G10L 15/16
2024/0290320 A1 *　8/2024　Huang .................... G10L 15/16
2025/0078842 A1 *　3/2025　Park ....................... G10L 17/06
2025/0095652 A1 *　3/2025　Chen ..................... G10L 15/063

FOREIGN PATENT DOCUMENTS

WO　　WO-2023183262 A1 *　9/2023　............. G10L 15/16

* cited by examiner

*Primary Examiner* — Satwant K Singh
(74) *Attorney, Agent, or Firm* — Kilpatrick Townsend & Stockton LLP

(57)　　　　　　ABSTRACT

One example method includes generating teacher and student ASR models from an ASR model; generating a plurality of successive generations of the teacher ASR model, including: generating, for each unannotated audio sample of a training data set, one or more pseudo-labels corresponding to the respective unannotated audio sample using the current generation teacher ASR model; generating a plurality of successive generations of the student ASR model, including: providing a subset of the training data set as training inputs to the student ASR model, the training data set including the plurality of unannotated audio samples and the corresponding pseudo-labels, training the student ASR model using the subset of the training data set to generate a next generation of the student ASR model, and evaluating the current student ASR model to determine whether to include the current model in a subset of the generations of the student ASR model; generating a next generation of the teacher ASR model based on the subset of the generations of the student ASR model; responsive to reaching a completion condition, outputting a current generation of the teacher ASR model.

20 Claims, 7 Drawing Sheets

500

SEMI-SUPERVISED TRAINING OF AUTOMATIC SPEECH RECOGNITION SYSTEMS USING ITERATIVE *n*-best PSEUDO-LABELING

FIELD

This application generally relates to automatic speech recognition, and more generally relates to semi-supervised training of automatic speech recognition systems using iterative n-best pseudo-labeling.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
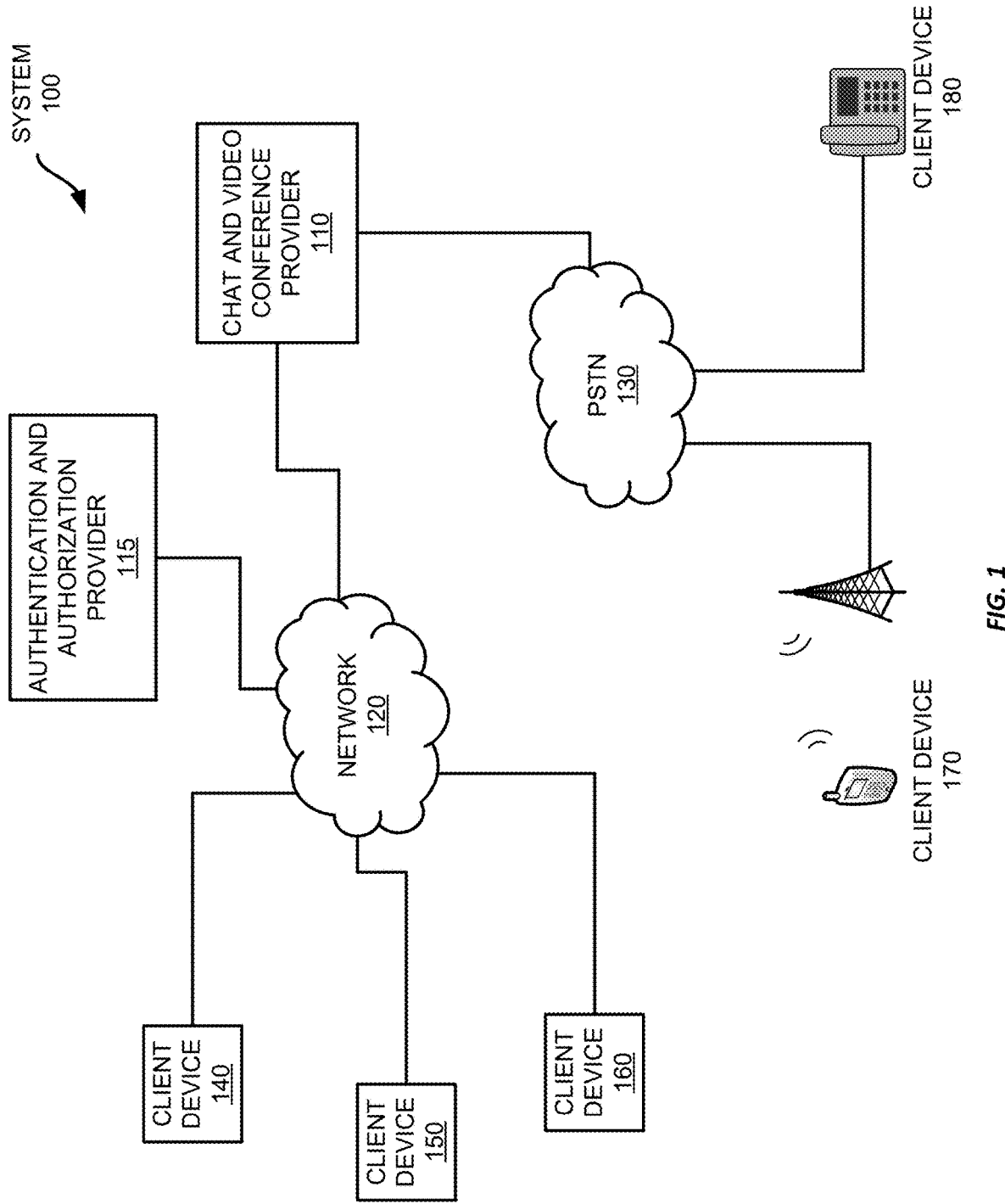
FIGS. 1-2 show example systems for semi-supervised training of automatic speech recognition systems using iterative n-best pseudo-labeling.

Examples are described herein in the context of semi-supervised training of automatic speech recognition systems using iterative n-best pseudo-labeling. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Automatic speech recognition ("ASR") systems receive audio that includes spoken words and generate corresponding transcriptions of those spoken words. ASR technology is helpful in a variety of settings, such as in video conferencing, which may use ASR to generate transcripts of video conferences or to provide real-time subtitles or translation during those video conferences.

Training ASR systems to accurately transcribe speech to text, however, can be a time-consuming and resource-intensive process. This can be exacerbated when available training data includes some audio samples that do not have corresponding transcriptions. Typically, training is performed by providing an audio sample and a corresponding transcript of the audio sample to an ASR system, which estimates parameters from them. If an audio sample lacks a corresponding transcript, this process does not work.

Instead, a training process can involve generating pseudo-labels for audio samples that lack corresponding transcripts. The ASR system generates a transcript for one such audio sample. The generated transcript is called "pseudo-labels" because the transcript was not generated by a person, and thus the labels have not been separately verified. However, if the generated transcript is sufficiently accurate, it can be used in conjunction with the audio sample as training data for an ASR system, which can be used to further improve the ASR system.

A difficulty with such an approach, however, is that, for large sets of audio samples that lack corresponding transcripts, after generating transcripts for the audio samples and using the audio samples and generated transcripts as training data, the process is then repeated multiple times to iteratively refine the ASR system. However, re-generating transcripts for the audio samples over multiple different training intervals (or "epochs") is very time consuming and resource intensive. For example, if each epoch involves 20,000 iterations that each involve providing a portion of the training data set to the ASR system and then updating the ASR system, these 20,000 iterations for each epoch can take significant amounts of time and computational resources. This is exacerbated when the number of training epochs needed is in the tens or hundreds.

To alleviate this issue, a process for iteratively pseudo-labeling audio samples to train an ASR system that reduces the computational demands on the ASR system may be used. For example, a set of training data that includes some audio samples without a corresponding transcript (referred to as "unannotated" audio samples) is provided to an existing ASR system that is targeted for further refinement. In this example, the set of training data also includes some audio samples that do have corresponding transcripts (referred to as "annotated" audio samples).

To refine the ASR system, the existing ASR system is duplicated to create a first generation "teacher" ASR system and a first generation "student" ASR system. The teacher ASR system is then used to generate pseudo-labels for the unannotated audio samples in the training data set. A portion of the training data set, including some annotated audio samples as well as some unannotated audio samples with their corresponding pseudo-labels, are used to train the student ASR system during a first epoch, which generates a second generation student ASR system. The process is then repeated by providing a portion of the training data set, either the same portion or a different portion, to train the second generation student ASR system, which generates a third generation student ASR system.

As subsequent generations of the student ASR system are generated using the same process, each is evaluated using a validation data set of annotated audio samples. To do so, the student ASR systems transcribe the audio samples from the validation data set and the outputs are compared against the annotations for the audio samples in the validation data set. Thus, the quality of each generation of student ASR systems may be evaluated. N-best student ASR systems can be selected in this way, if the n best list remains the same for a predetermined number of iterations, then the n best student ASR systems will be are selected and used to generate a new ASR system by accumulating their parameters. This accumulated ASR system then replaces the first-generation teacher ASR system and becomes the second-generation teacher ASR system. The second-generation teacher ASR system is then used to generate new pseudo-labels for the unannotated audio samples in place of the pseudo-labels generated by the first-generation teacher ASR system.

After the new pseudo-labels have been generated, the training process continues to create additional generations of student ASR systems, while maintaining the n-best student ASR systems by replacing existing "best" student ASR systems with newer generations, when they perform better than one of those in the n-best set. When the n-best set remains unchanged for a predetermined number of epochs, the n-best student ASR systems are then averaged again, which then becomes the third-generation teacher ASR system that replaces the second-generation teacher ASR system. This entire process continues, generating subsequent generations of teacher ASR systems until the training runs for a predetermined number of epochs. At such time, the then-current generation of teacher ASR systems is output as the refined ASR system. Using such a technique, the amount of pseudo-labeling performed at each training epoch is significantly reduced because each training epoch does not involve generating entire new sets of pseudo-labels. Instead, pseudo-labels are not re-generated until a new generation of teacher ASR model has been generated. Thus, multiple generations of student models can be generated for a single set of pseudo-labels. By using such a technique, an ASR system can be iteratively refined using unannotated audio samples and corresponding pseudo-labels, but using less time and with considerably less computational burden on the training platform.

This illustrative example is given to introduce the reader to the general subject matter discussed herein and the disclosure is not limited to this example. The following sections describe various additional non-limiting examples and examples of semi-supervised training of automatic speech recognition systems using iterative n-best pseudo-labeling.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
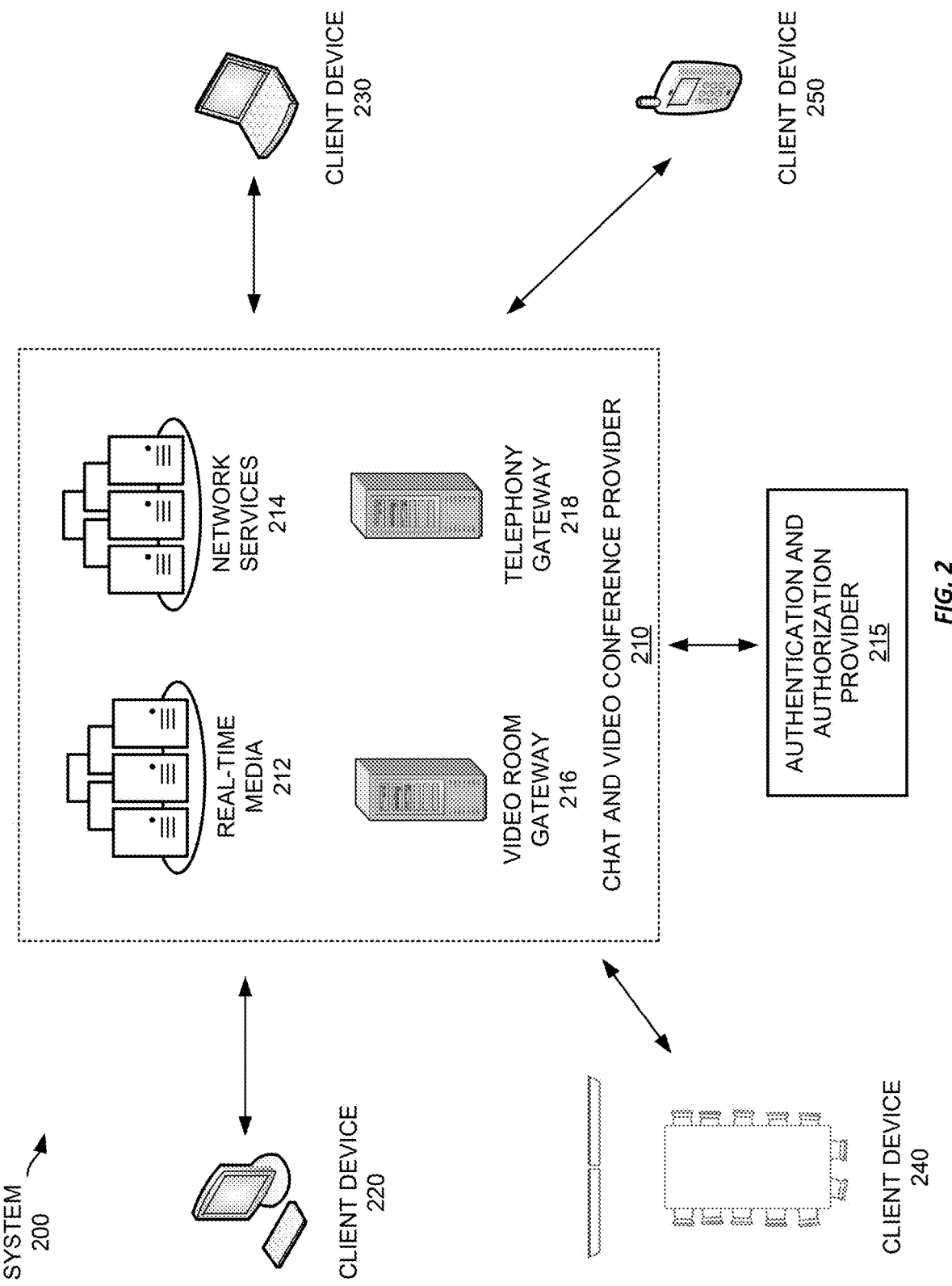

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider

115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. Etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
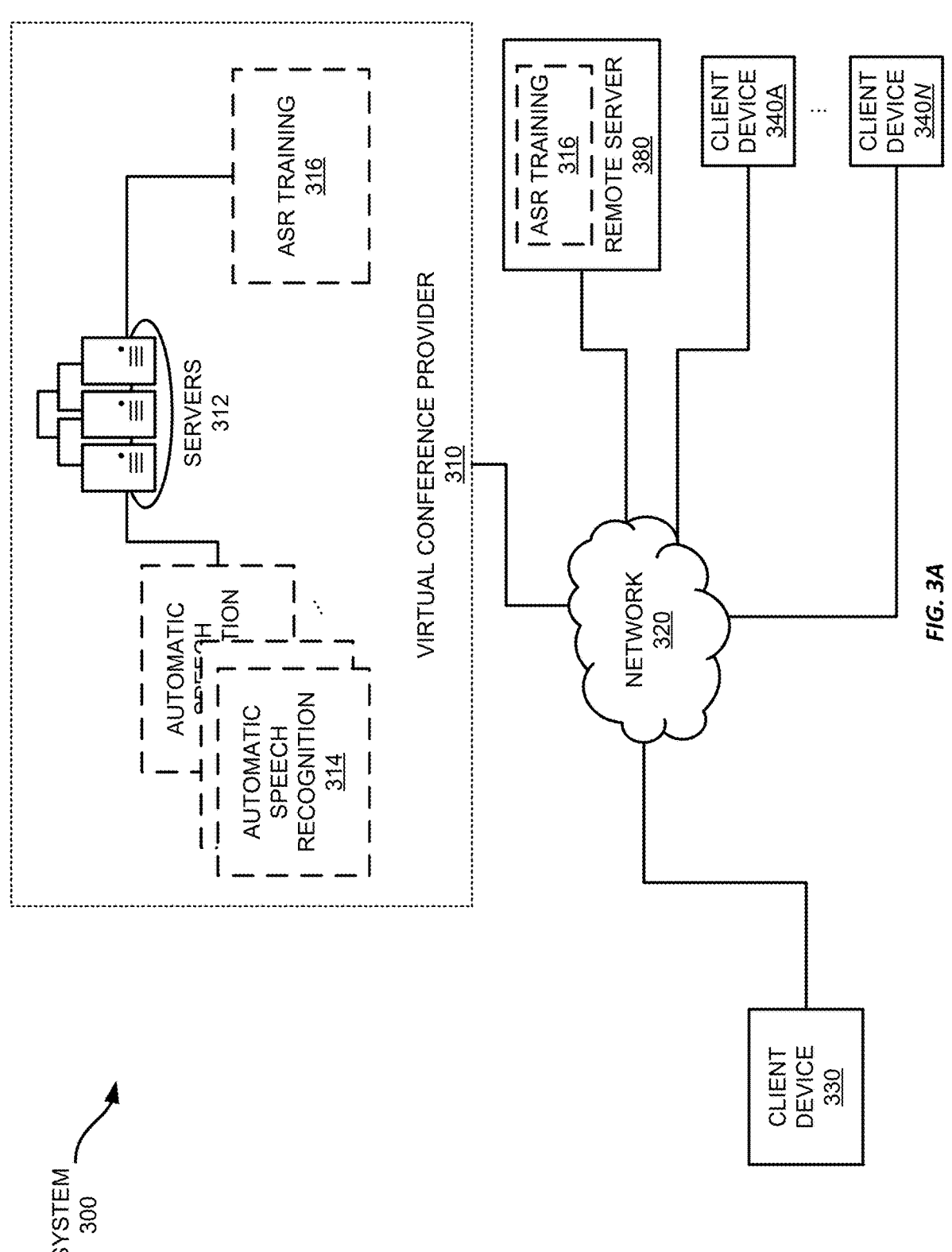
FIGS. 3A-3B show an example system for semi-supervised training of automatic speech recognition systems using iterative n-best pseudo-labeling.

Referring now to FIG. 3A, FIG. 3A illustrates an example system for semi-supervised training of automatic speech recognition systems using iterative n-best pseudo-labeling. The example system includes a virtual conference provider 310 that provides ASR functionality to users that engage in video or audio conferencing hosted by the virtual conference provider 310. The virtual conference provider 310 manages a number of servers 312 to provide virtual conferencing functionality, generally as described above with respect to FIGS. 1-2. In addition, these servers provide ASR functionality 314 that can be accessed during or after a virtual conference, such as to provide closed-captioning or to generate transcripts of the virtual conference. Because the virtual conference provider 310 may handle multiple concurrent virtual conferences, some of which may employ ASR functionality 314, the virtual conference provider 310 provides many instances of the ASR functionality 314, as needed, to handle the various ASR-enabled virtual conferences.

Multiple client devices 330, 340*a-n* may connect to the virtual conference provider 310 to engage in a virtual conference. For example, the user of client device 330 may initiate a virtual conference as the host, and users of client device 340*a-n* may join the virtual conference as participants. During the virtual conference, the participants (including the host) may discuss any matters of interest. If the host enables ASR functionality, audio streams received by the virtual conference provider 310 are both distributed to the various participants client devices 330, 340*a-n*, but are also provided to an instance the ASR functionality 314 allocated to the virtual conference to generate transcriptions of the speech contained within the audio streams. If the host only enables closed-captioning, the transcriptions may be provided in real-time to one or more participants, but a full transcript is not generated and stored. However, if the host enables transcription of the virtual conference, the ASR functionality 314 generates and stores a transcription of the speech recognized during the virtual conference (and may also provide real-time closed-captioning to one or more participants). The transcript may then be accessed by the host or shared with one or more of the participants. It should be appreciated that the ASR functionality may run in real-time during the virtual conference to generate the transcript in real-time; however, some examples may instead record the audio from the virtual conference and the ASR functionality 314 may process the audio after the virtual conference has concluded.

In this example, the virtual conference provider 310 has trained its ASR functionality 314 using content available from licensed, commercially usable datasets to provide generalized ASR functionality to accommodate most conversations. However, because such datasets may not include many annotated audio samples in some languages, ASR performance in those languages may be sub-optimal or simply may not be provided by the virtual conference provider due to lack of training data.

In this example system, the virtual conference provider 310 also employs ASR training functionality 316 to further improve the performance of its ASR functionality 314. For example, certain ASR functionality 314 may be trained on audio samples that have corresponding human-generated transcripts (or annotations) that provide ground truth for the ASR system during a training process. Such audio samples are generally referred to as "annotated" audio samples because they have transcripts that have been generated or verified by a person. However, for some languages, very few annotated audio samples may be available for training, leading to ASR functionality that is not as well-trained and therefore provides less reliable speech recognition. Thus, the ASR training functionality 316 may be used to provide semi-supervised training of ASR systems using iterative n-best pseudo-labeling.

To assist in training its ASR functionality 314, the virtual conference provider 310 can employ its own ASR training functionality 316 to improve the performance of a previously trained ASR model. And while this example illustrates the ASR training functionality 316 at the virtual conference provider 310, in some examples, the ASR training functionality 316 may be provided by a third party, such as at remote server 380, or it may even be performed by a client device to enable personal ASR functionality for the user of the client device. After the ASR training functionality 316 has been employed for an initially trained ASR model, the improved ASR model may be deployed by the virtual conference provider 310 to provide ASR functionality 314 for virtual conferences.

Figure 3B:
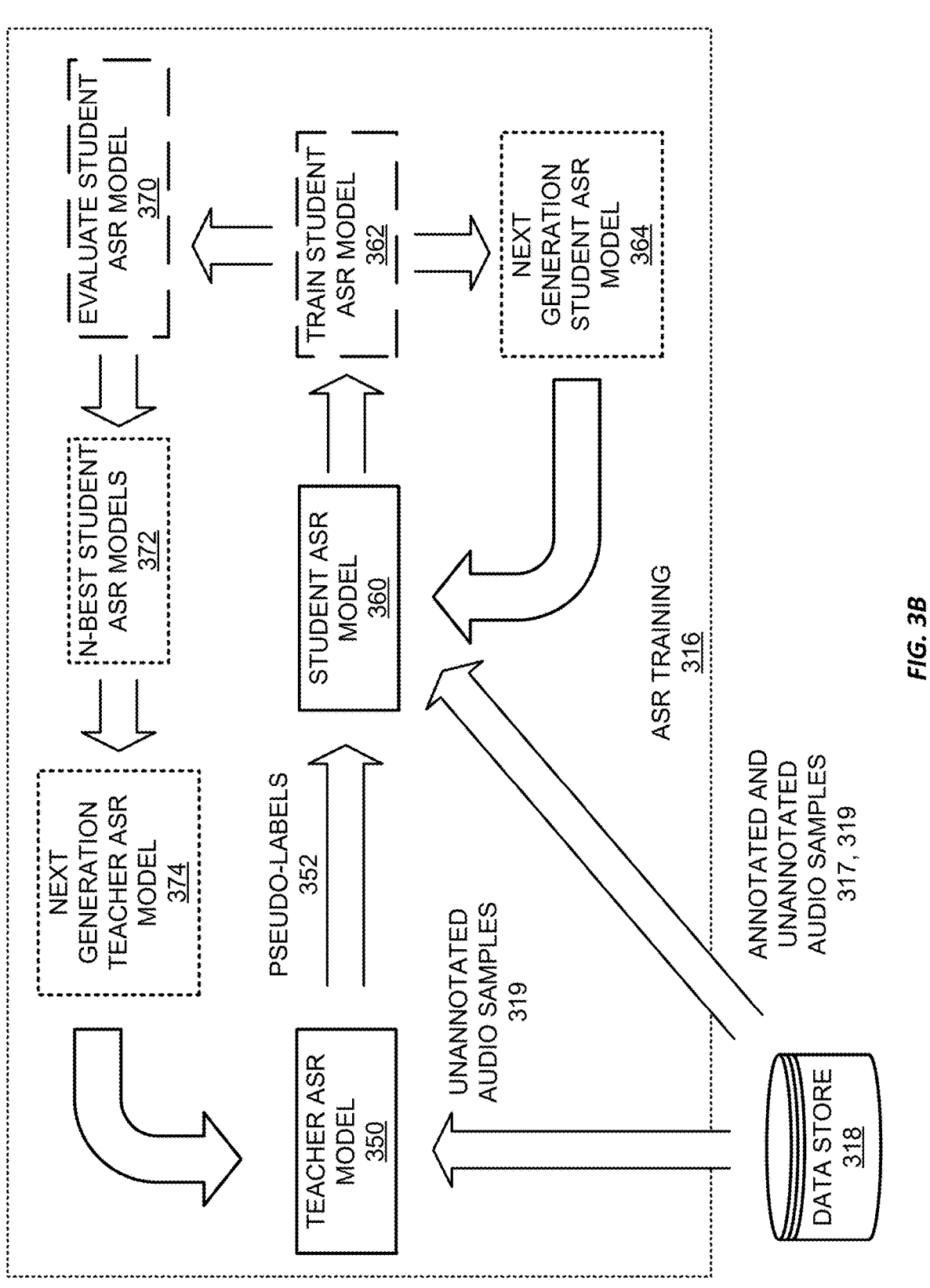

Referring now to FIG. 3B, FIG. 3B shows the example ASR training functionality 316 depicted in FIG. 3A. The ASR training functionality 316 accesses a data store 318 that includes training data to be used to improve a pre-trained ASR model. The training data stored in the data store 318 in this example includes both annotated and unannotated audio samples. The pre-trained ASR model may be one that has been trained on available annotated data, as discussed above.

To further train a pre-trained ASR model, the ASR training functionality 316 generates a teacher ASR model and a student ASR model from the pre-trained ASR model. In this example, the ASR training functionality 316 makes two copies of the pre-trained ASR model and designates one as the teacher ASR model 350 and the other as the student ASR model 360. For purposes of this description, each of these initial copies of the pre-trained ASR model are referred to as the first-generation teacher or student ASR model. In this example, the ASR models 350, 360 include a machine-learning ("ML") model that has been trained to recognize speech. In this example, the trained ML model is based on a long short-term memory ("LSTM") model with an attention mechanism that has been trained on commercially available datasets. However, any suitable type of ML model may be used, including other types of neural networks (e.g., transformers and convolutional neural networks).

After generating the teacher and student ASR models 350, 360, the ASR training functionality supplies the unannotated audio samples 319 to the teacher ASR model 350, which performs ASR to generate pseudo-labels 352 for the audio samples. The pseudo-labels 352 provide recognized speech corresponding to the unannotated audio samples 319, but are referred to as "pseudo-labels" because they have not been verified by a person for accuracy. Instead, they may contain errors due to the performance limitations of the teacher ASR model 350. It should be appreciated that while pseudo-labels 352 are generated for each of the unannotated audio samples stored in the data store 318, in some examples, the teacher ASR model 350 may only be provided a subset of the unannotated audio samples.

After the pseudo-labels 352 have been generated, the corresponding unannotated audio samples, and in some examples a subset of annotated audio samples, are provided to the first-generation student ASR model 360. The first-generation student ASR model generates its own transcriptions of the inputted audio samples and the pseudo-labels or annotations are then used to further train the first-generation student ASR model 362 to generate a new generation of student ASR model 364, the second-generation student ASR model in this case. In addition, the first-generation student ASR model 360 is evaluated using a validation data set to determine a score, e.g., a word error rate ("WER") or average validation loss, for the first-generation student ASR model 360. The first-generation student ASR model 360 is then saved as one of the n-best student ASR models. In some examples, however, the score for the student ASR model is compared to a predetermined threshold score, e.g., the WER for the original pre-trained ASR model. If the score for the student ASR model is better than the predetermined threshold, then the student ASR model is added to the n-best list. Otherwise, it is not. This same predetermined threshold may also be used for each successive generation of student ASR model to help ensure that student ASR models with unsuitable performance are not included in the n-best list.

The second-generation student ASR model 364 then replaces the first-generation student ASR model 360, and the process repeats by providing the previously generated pseudo-labels 352 as well as unannotated and annotated audio samples (and corresponding transcripts) 317, 319 to the second-generation student ASR model 360. The second-generation student ASR model 360 is then further trained 362 to generate a third-generation student ASR model and its outputs are evaluated to provide a score for the second-generation student ASR model. The second-generation student ASR model is then saved off along with the first-generation student ASR model.

This process continues until the n-best list has been fully populated and remains unchanged for a predetermined number of iterations. During this process, the ASR training functionality 316 maintains copies of the n-best generation student ASR models based on their respective evaluations. If n is set to five, for example, then student ASR models in the n-best list may be replaced once the list reaches five student ASR models and a new generation student ASR model has a better score than one or more of the student ASR models in the n-best list. Thus, the ASR training functionality 316 maintains a current set of five student ASR models having the best scores.

Once the n-best list has been filled for the first time and remains unchanged for a predetermined number of iterations, the five student ASR models in the n-best list are used to generate a new teacher ASR model, the second-generation teacher ASR mode 374. In this example, the ASR training functionality averages the five student ASR models in the n-best list, though any suitable technique may be employed. For example, a weighted average based on their respective scores may be used, e.g., by weighting each by its score and dividing by the sum of the scores. Still other techniques may be used in other examples.

Once the next generation teacher ASR model 374 has been generated, the n-best list is maintained, but the first-generation teacher ASR model 350 is replaced by the second-generation teacher ASR model 374. The second-generation teacher ASR model 374 is then supplied with the unannotated audio samples 319 and it generates a new set of second-generation pseudo-labels 352 to replace the prior set of pseudo-labels generated by the first-generation teacher ASR model 350. Once the second-generation pseudo-labels 352 have been generated, the ASR training functionality supplies annotated and unannotated audio samples and the second-generation pseudo-labels to the then-current generation of student ASR model 360 and the process continues. When a new generation of student ASR model 360 has a good enough score to replace an existing entry in the n-best list, the n-best list is updated to include the new generation student ASR model 360 and the entry in the n-best list with the worst score is removed. In this example, this process continues until the n-best list remains unchanged for a predetermined number of iterations, at which time a new generation of teacher ASR model 374 is then generated. The new generation of teacher ASR model replaces the prior generation teacher ASR model and is then used to generate a new generation of pseudo-labels. However, in some examples, rather than generating a new generation teacher ASR model 374 only after the n-best list is unchanged for a predetermined number of epochs, the new generation teacher ASR model may be generated as soon as a new generation student ASR model is generated or only after a predetermined number of epochs.

This process then continues until a completion condition has been satisfied. For example, the ASR training functionality 316 may be configured to generate a pre-determined number of generations of teacher ASR model and then terminate the training process. In some examples the ASR training functionality 316 may determine a number of generations of student ASR models that have been generated without a new addition to the n-best list following the generation of a new generation of teacher ASR model, e.g., after twenty generations of student ASR models that do not exceed the scores of any student ASR models in the n-best list, the ASR training functionality 316 halts the training process. Still other techniques may be employed according to some examples to determine whether a completion condition has been satisfied.

Once the completion condition is satisfied, the training process halts, and a final generation of the teacher ASR model is generated from the n-best list and is output as the trained ASR model. The trained ASR model may then be added to the ASR functionality 314 provided by the virtual conference provider 310. Thus, the ASR training functionality 316 is able to generate an ASR model having improved performance over the initial pre-trained ASR model. Further, such a technique avoids issues of convergence between teacher and student models because an amalgamation of the n-best student ASR models is used, e.g., by averaging them.

Figure 4:
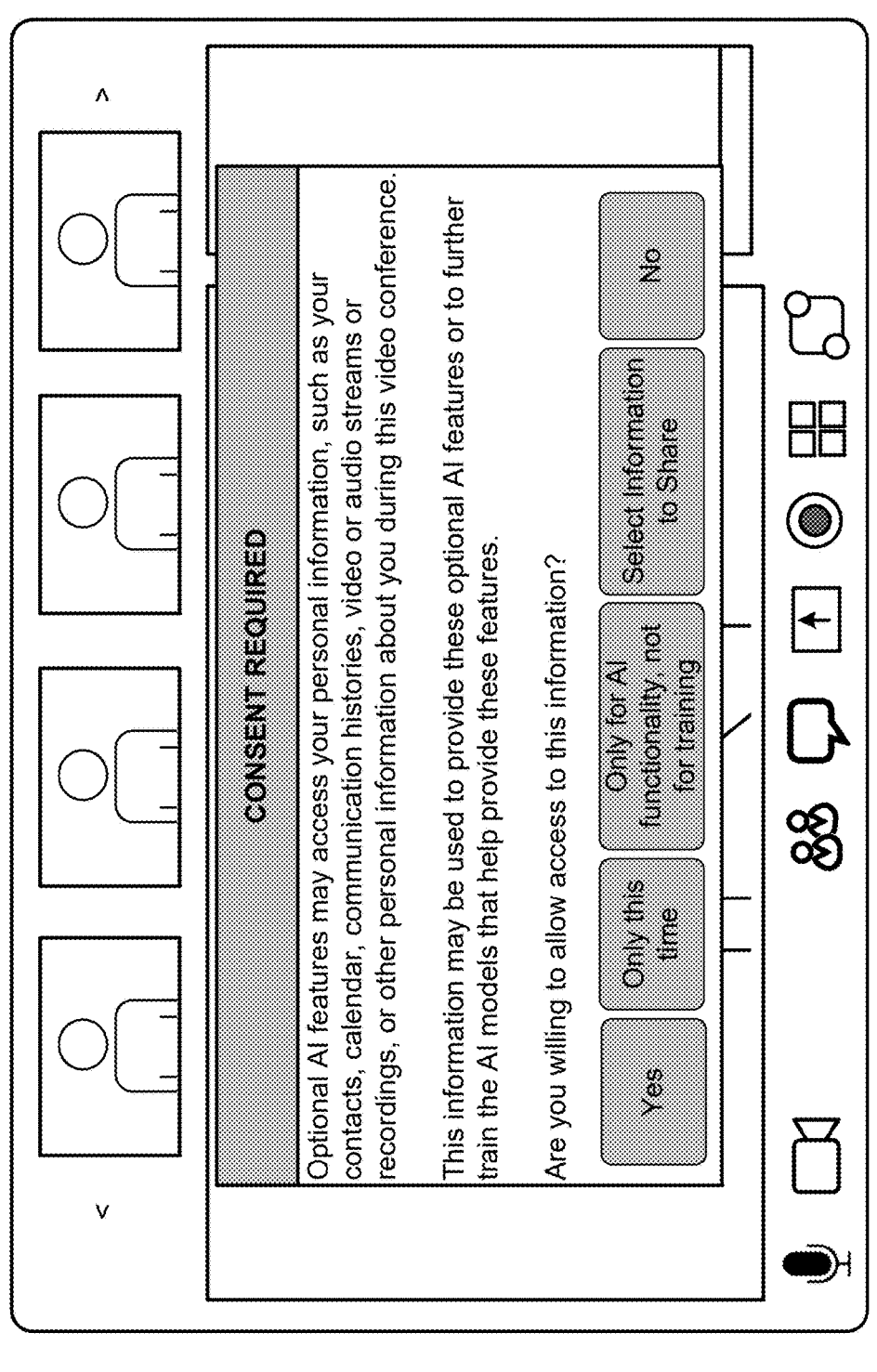
FIG. 4 shows an example system for semi-supervised training of automatic speech recognition systems using iterative n-best pseudo-labeling.

Referring now to FIG. 4, FIG. 4 shows a GUI 400 presenting a consent option to employ certain AI-assisted features. In some examples according to the present disclosure, a user may select an option to use one or more optional AI features available from the virtual conference provider, such as ASR functionality or to train that ASR functionality as described herein. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available to the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 4, a user has engaged in a video conference and has selected an option to use an available optional AI feature. In response, the GUI has displayed a consent authorization window for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 5:
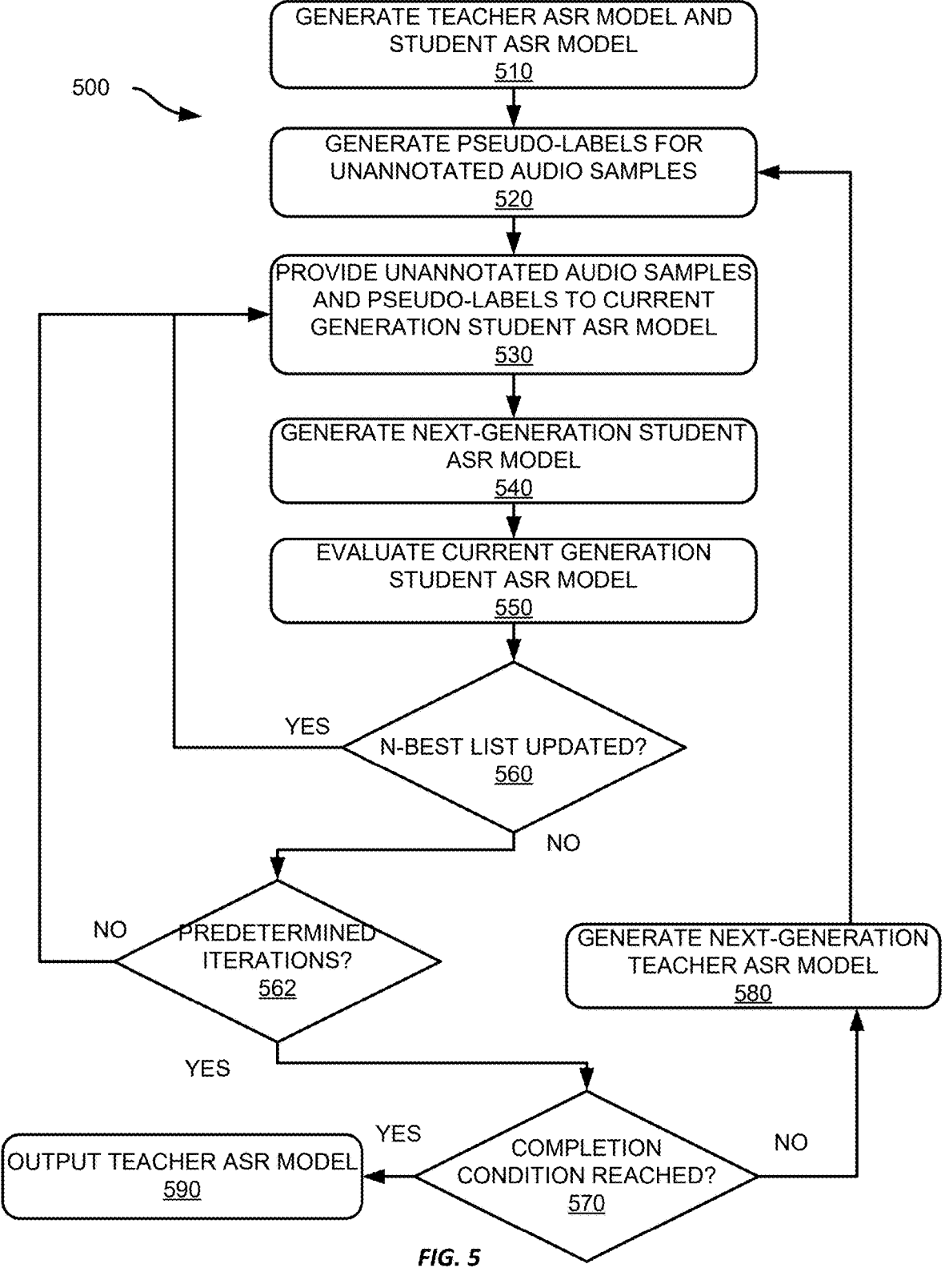
FIG. 5 shows an example method for semi-supervised training of automatic speech recognition systems using iterative n-best pseudo-labeling.

Referring now to FIG. 5, FIG. 5 shows an example method 500 for semi-supervised training of automatic speech recognition systems using iterative n-best pseudo-labeling. The example method 500 will be discussed with respect to the system shown in FIG. 3A-3B; however, any suitable system according to this disclosure may be employed, including the example systems 100, 200 shown in FIGS. 1 and 2. Moreover, while the discussion has been with respect to the operating environment of a virtual conference provider, any suitable service provider, server, or client device may perform one or more methods, or implement one or more systems, according to this disclosure.

At block 510, the ASR training functionality 316 generates a teacher ASR model 350 and a student ASR model 360 from an ASR model, generally as described above with respect to FIG. 3B. In this example, the ASR model is a pre-trained ASR model and the ASR training functionality 316 generates the teacher ASR model 350 and the student ASR model 360 by generating two copies of the pre-trained ASR model. The ASR training functionality 316 then designates one copy as the teacher ASR model 350 and the other copy as the student ASR model 360. As discussed with respect to FIG. 3B, the initial teacher and student ASR models 350, 360 are referred to as the first-generation teacher and student ASR models, respectively.

At block 520, the ASR training functionality 316 uses the current-generation teacher ASR model 350 to generate pseudo-labels 352 for a set of unannotated audio samples 319, generally as described above with respect to FIG. 3B. As discussed above, unannotated audio samples 319 are provided to the current-generation teacher ASR model 350, which generates transcriptions of the audio samples that are provided as pseudo-labels 352 to the current-generation student ASR model 360 at block 530.

At block 530, the ASR training functionality 316 provides unannotated audio samples 319 and corresponding pseudo-labels 352 to the current-generation student ASR model 360, which generates corresponding outputs, generally as described above with respect to FIG. 3B. A training dataset for a student ASR model 360 may include both annotated and unannotated audio samples 317, 319. In this example, the ASR training functionality 316 provides unannotated audio samples 319 and pseudo-labels 352 to the current-generation student ASR model; however, in some examples, the ASR training functionality may provide annotated audio samples (and their corresponding annotations) 317 in addition to the unannotated audio samples 319 and pseudo-labels 352.

At block 540, the ASR training functionality 316 trains the current-generation student ASR model 360 based on the outputs generated by the current-generation student ASR model 360, generally as described above with respect to FIG. 3B. Training the current-generation student ASR model 360 generates a next-generation student ASR model, which is then used in place of the current-generation student ASR model ASR model 360 for the next iteration.

At block 550, the ASR training functionality 316 evaluates the current-generation student ASR model 360 using a validation dataset, generally as discussed above with respect to FIG. 3B. For example, the validation dataset may include annotated audio samples, where the audio samples are provided to the current-generation student ASR model 360 and the outputs are compared with the corresponding annotations. The ASR training functionality 316 may evaluate the current-generation ASR model 360 on one or more metrics, such as WER or semantic analysis to determine whether semantic meaning is retained. Semantic analysis may be performed by a language model, such as a large language model. In some examples, it may evaluate based on average validation loss.

At block 560, the ASR training functionality 316 determines whether to include the current-generation student ASR model 360 in an n-best list 372. In this example, the ASR training functionality 316 determines whether the WER for the current-generation student ASR model 360 is better than one or more prior-generation student ASR models already included in the n-best list 372. In some cases, the n-best list may have empty entries, e.g., after the first generation, only one student ASR model 360 has been evaluated and may be immediately inserted into the n-best list 372, and a copy of the student ASR model 360 is maintained. Subsequent generations of student ASR models may also be added immediately due to the presence of empty entries in the n-best list 372, with copies of each retained. Though, in some examples, the ASR training functionality may employ a pre-determined threshold WER (or other metric) that must be satisfied for a student ASR model to be a candidate for inclusion in the n-best list. For example, the ASR training functionality 316 may determine a WER for a current-generation teacher ASR model 350 and use it as the pre-determined threshold WER.

If the n-best list has been updated through the current iteration, whether adding a student ASR model to an unfilled n-best list or replacing a current entry in the n-best list with the current-generation student ASR model, the method returns to block 530 for the next-generation student ASR model. Otherwise, if the n-best list has not been updated through the current iteration, the method proceeds to block 362.

At block 562, the ASR training functionality determines whether the n-best list has been unchanged for a predetermined number of iterations. If the ASR training functionality 316 determines that the n-best list 372 has been unchanged for the predetermined number of iterations, method proceeds to block 570. Alternatively, if the n-best list 372 has not been unchanged for the predetermined number of iterations, the method returns to block 530 for the next generation student ASR model.

At block 570, the ASR training functionality 316 determines if a completion condition has been reached 380, generally as discussed above with respect to FIG. 3B. In this example, the ASR training functionality 316 determines whether the predetermined number of generations has elapsed without an update to the n-best list since the current generation teacher ASR model has been generated. In other words, if the ASR training functionality determines no changes have been made to the n-best list since the current generation of teacher ASR model has been generated, and the predetermined number of iterations has been reached, the ASR training functionality determines that the training has completed and the method proceeds to block 590. However, if the n-best list has changed since the current generation teacher ASR model was generated, the method proceeds to block 580.

At block 580, the ASR training functionality 316 generates a next-generation teacher ASR model 374, generally as described above with respect to FIG. 3B. In this example, the ASR training functionality 316 averages the student ASR models within the n-best list 372 to generate the next-generation teacher ASR model 374. However, in other examples, different approaches may be used, such as using a weighted average of the entries in the n-best list 372. The method then returns to block 520, using the new generation of teacher ASR model 374.

At block 590, the ASR training functionality 316 outputs the current generation teacher ASR model as the trained ASR model.

Once the trained ASR model has been output, it may be incorporated into the virtual conference providers ASR functionality 314 and allocated to one or more virtual conferences to provider ASR functionality, such as real-time subtitles or transcript generation, whether in real-time or based on a recording of audio streams from the virtual conference.

While the method 500 has been described as occurring in a particular order, it should be appreciated that examples according to this method may be performed in different orders or in parallel, such as blocks 540 and 550 may be performed in different orders or in parallel according to different examples.

Figure 6:
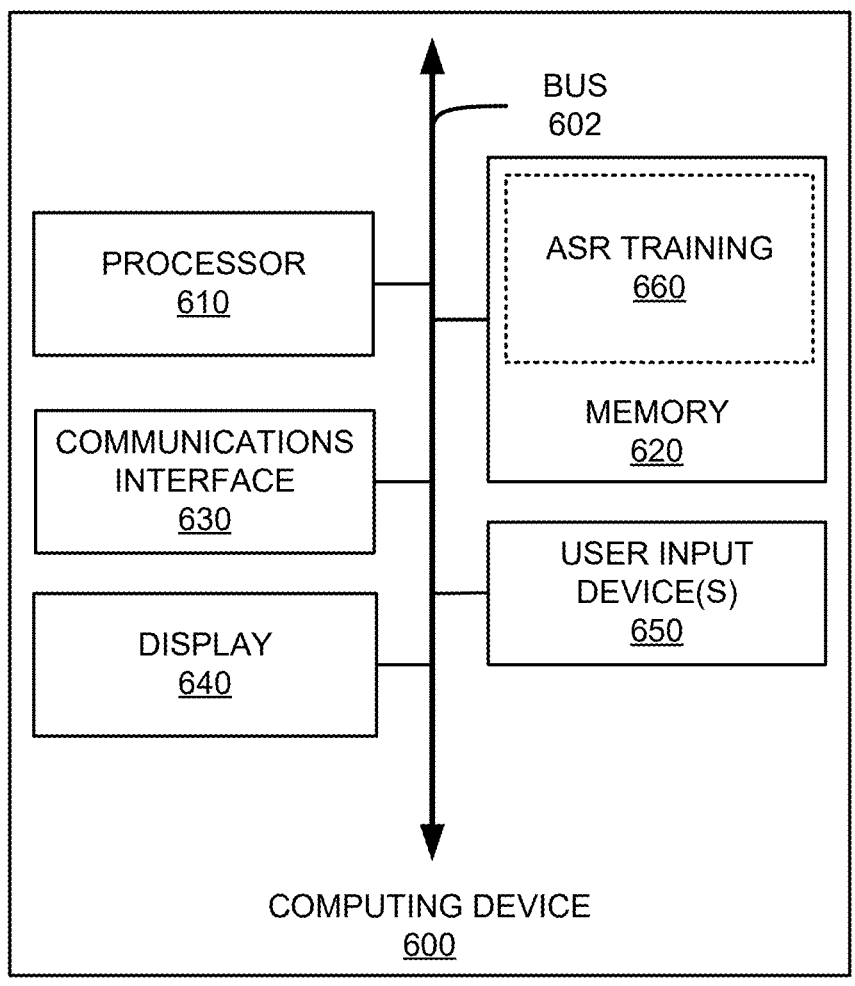
FIG. 6 shows an example computing device suitable for use with example systems and methods of semi-supervised training of automatic speech recognition systems using iterative n-best pseudo-labeling.

Referring now to FIG. 6, FIG. 6 shows an example computing device 600 suitable for use in example systems or methods for semi-supervised training of automatic speech recognition systems using iterative n-best pseudo-labeling according to this disclosure. The example computing device 600 includes a processor 610 which is in communication with the memory 620 and other components of the computing device 600 using one or more communications buses 602. The processor 610 is configured to execute processor-executable instructions stored in the memory 620 to perform one or more methods for using an AI-assistant to generate notifications during virtual conferences according to different examples, such as part or all of the example method 500 described above with respect to FIG. 5. Suitable example computing devices 600, such as user client devices, may also include one or more user input devices 650, such as a keyboard, mouse, touchscreen, microphone, etc., to accept user input. The computing device 600 also includes a display 640 to provide visual output to a user. In addition, the computing device 600 includes ASR training functionality 660, such as discussed above with respect to FIG. 3A-3B.

The computing device 600 also includes a communications interface 630. In some examples, the communications interface 630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   generating a teacher ASR model and a student ASR model from an ASR model;
   generating a plurality of successive generations of the teacher ASR model, comprising, for a respective teacher ASR model generation:
      generating, for each unannotated audio sample of a plurality of unannotated audio samples of a training data set, one or more pseudo-labels corresponding to the respective unannotated audio sample using the current generation teacher ASR model;
      generating a plurality of successive generations of the student ASR model, comprising, for a respective student ASR model generation:
         providing a subset of the training data set as training inputs to the respective generation of the student ASR model, the training data comprising the plurality of unannotated audio samples and the respective corresponding pseudo-labels,
         training the respective generation of the student ASR model using the subset of the training data set to generate a next generation of the student ASR model, and
         evaluating the respective generation of the student ASR model to determine whether to include the respective generation in a subset of the generations of the student ASR model;
      generating a next generation of the teacher ASR model based on the subset of the generations of the student ASR model; and
   responsive to reaching a completion condition, outputting a current generation of the teacher ASR model.

2. The method of claim 1, wherein the training data set further comprises a plurality of annotated audio samples, and wherein providing the subset of the training data set further comprises providing a subset of the plurality of annotated audio samples.

3. The method of claim 1, wherein evaluating the current generation of the student ASR model comprises:
   providing annotated audio samples from a validation data set to the respective student ASR model generation;
   determining a score for the respective student ASR model generation; and
   adding the respective student ASR model generation to the subset of the generations of the student ASR model based on the score.

4. The method of claim 3, wherein evaluating each generation of the student ASR model comprises determining whether the score for the respective generation of the student ASR model satisfies a predetermined threshold.

5. The method of claim 1, wherein generating the next generation of the teacher ASR model comprises averaging the subset of the generations of the student ASR model.

6. The method of claim 5, wherein averaging the subset of the generations of the student ASR model comprises generating a weighted average of the subset of the generations of the student ASR model.

7. The method of claim 1, wherein the completion condition comprises determining that the subset of the generations of the student ASR model has remained unchanged for a predetermined number of new generations of the student ASR model.

8. The method of claim 1, wherein the completion condition comprises generating a predetermined number of generations of the teacher ASR model.

9. The method of claim 1, wherein generating a next generation of the teacher ASR model is responsive to replacing a predetermined number of the subset of the generations of the student ASR model with newer generations of the student ASR model.

10. A system comprising:
   a communications interface;
   a non-transitory computer-readable medium; and
   one or more processors configured to execute processor-executable instructions stored in the non-transitory computer-readable medium to:
      generate a teacher ASR model and a student ASR model from an ASR model;
      generate a plurality of successive generations of the teacher ASR model, comprising executing processor-executable instructions, for a respective teacher ASR model generation, to:
         generate, for each unannotated audio sample of a plurality of unannotated audio samples of a training data set, one or more pseudo-labels corresponding to the respective unannotated audio sample using the current generation teacher ASR model;
         generate a plurality of successive generations of the student ASR model, comprising executing processor-executable instructions, for a respective student ASR model generation, to:
            provide a subset of the training data set as training inputs to the respective generation of the student ASR model, the training data comprising the plurality of unannotated audio samples and the respective corresponding pseudo-labels,
            train the respective generation of the student ASR model using the subset of the training data set to generate a next generation of the student ASR model, and evaluate the respective generation of the student ASR model to determine whether to include the respective generation in a subset of the generations of the student ASR model;

generate a next generation of the teacher ASR model based on the subset of the generations of the student ASR model; and responsive to reaching a completion condition, output a current generation of the teacher ASR model.

11. The system of claim 10, wherein the one or more processors are configured to execute further processor-executable instructions stored in the non-transitory computer-readable medium to:

provide annotated audio samples from a validation data set to the respective student ASR model generation;

determine a score for the respective student ASR model generation; and add the respective student ASR model generation to the subset of the generations of the student ASR model based on the score.

12. The system of claim 11, wherein the one or more processors are configured to execute further processor-executable instructions stored in the non-transitory computer-readable medium to determine whether the score for the respective generation of the student ASR model satisfies a predetermined threshold.

13. The system of claim 10, wherein the one or more processors are configured to execute further processor-executable instructions stored in the non-transitory computer-readable medium to average the subset of the generations of the student ASR model.

14. The system of claim 13, wherein the one or more processors are configured to execute further processor-executable instructions stored in the non-transitory computer-readable medium to generate a weighted average of the subset of the generations of the student ASR model.

15. The system of claim 10, wherein the completion condition comprises determining that the subset of the generations of the student ASR model has remained unchanged for a predetermined number of new generations of the student ASR model.

16. The system of claim 10, wherein the completion condition comprises generating a predetermined number of generations of the teacher ASR model.

17. The system of claim 10, wherein generating a next generation of the teacher ASR model is responsive to replacing a predetermined number of the subset of the generations of the student ASR model with newer generations of the student ASR model.

18. A non-transitory computer-readable medium comprising processor-executable instructions configured to cause one or more processors to:

generate a teacher ASR model and a student ASR model from an ASR model;

generate a plurality of successive generations of the teacher ASR model, comprising processor executable instructions configured to cause the one or more processors, for a respective teacher ASR model generation, to:

generate, for each unannotated audio sample of a plurality of unannotated audio samples of a training data set, one or more pseudo-labels corresponding to the respective unannotated audio sample using the current generation teacher ASR model;

generate a plurality of successive generations of the student ASR model, comprising processor executable instructions configured to cause the one or more processors, for a respective student ASR model generation, to:

provide a subset of the training data set as training inputs to the respective generation of the student ASR model, the training data comprising the plurality of unannotated audio samples and the respective corresponding pseudo-labels, train the respective generation of the student ASR model using the subset of the training data set to generate a next generation of the student ASR model, and evaluate the respective generation of the student ASR model to determine whether to include the respective generation in a subset of the generations of the student ASR model;

generate a next generation of the teacher ASR model based on the subset of the generations of the student ASR model; and responsive to reaching a completion condition, output a current generation of the teacher ASR model.

19. The non-transitory computer-readable medium of claim 18, further comprising processor-executable instructions configured to cause the one or more processors to:

provide annotated audio samples from a validation data set to the respective student ASR model generation;

determine a score for the respective student ASR model generation; and add the respective student ASR model generation to the subset of the generations of the student ASR model based on the score.

20. The non-transitory computer-readable medium of claim 19, further comprising processor-executable instructions configured to cause the one or more processors to determine whether the score for the respective generation of the student ASR model satisfies a predetermined threshold.

* * * * *